United States Patent [19]
Bernstein et al.

[11] Patent Number: 6,026,318
[45] Date of Patent: Feb. 15, 2000

[54] MEDICAL IMAGE SCANNER WITH AUTOMATIC PATIENT WEIGHT DETERMINATION

[75] Inventors: Matthew A. Bernstein; Gregory A. Repinski, both of Waukesha, Wis.

[73] Assignee: General Electric Company, Milwaukee, Wis.

[21] Appl. No.: 08/984,362

[22] Filed: Dec. 3, 1997

[51] Int. Cl.[7] ............................................. A61B 5/00
[52] U.S. Cl. ..................... 600/427; 600/411; 600/587; 5/601; 5/611; 177/1
[58] Field of Search ................................ 600/407, 425, 600/427, 410, 411, 587; 5/601, 611, 614; 177/1, 132

[56] References Cited

U.S. PATENT DOCUMENTS 4,390,075  6/1983  Snead ........................................... 177/1
5,771,511  6/1998  Kummer et al. ............................. 5/600

*Primary Examiner*—Ruth S. Smith
*Attorney, Agent, or Firm*—B. Joan Haushalter; Christian G. Cabou; Phyllis Y. Price

[57] ABSTRACT

A method is provided for measuring the weight of a medical imaging scanner patient. The scanner has a bore portion for receiving and housing the patient during a scan. Initially, a reclining apparatus associated with the scanner is provided, on which the patient can recline during the scan. A hydraulic lift mechanism is then used to position the reclining apparatus and the patient at bore level. The pressure within the hydraulic lift mechanism can then be measured as a function of downward force exerted by the reclining apparatus and the patient surface. Alternatively, the automatic measuring of patient mass, associated with the movement of the reclining apparatus and patient into the bore, can be determined by calculating instantaneous acceleration of the reclining apparatus and patient as the reclining apparatus and patient are slid into the bore.

5 Claims, 3 Drawing Sheets

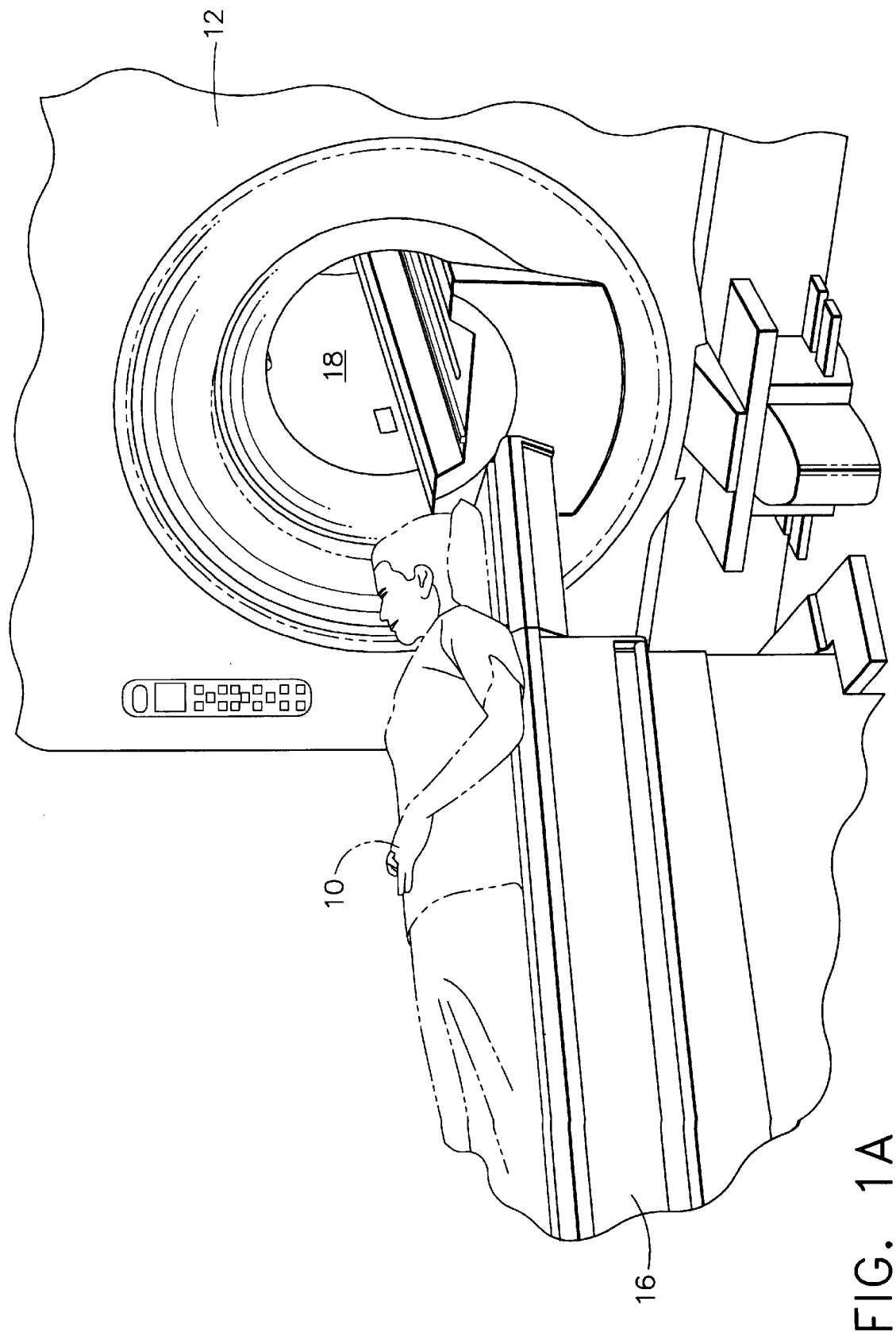

MEDICAL IMAGE SCANNER WITH AUTOMATIC PATIENT WEIGHT DETERMINATION

TECHNICAL FIELD

The present invention relates medical imaging scanners and, more particularly, to a medical imaging scanner capable of automatically measuring patient weight.

BACKGROUND ART

In medical image scanning, the patient reclines on a table (or other reclining apparatus such as a bed or cradle) during the scan. The table is initially outside the bore or tunnel. Often, the table is in a lowered position to allow the patient to easily access the table. Then, if necessary, the table and patient are raised to bore level. Finally, the table and patient are slid into the bore of the scanner.

Medical imaging scanners, such as MRI scanners, must have data about the patient weight to accurately perform the imaging task. For example, MRI scanners estimate the limits of rf power deposition, related to the specific absorption ratio (SAR) based on patient weight. The accuracy of the patient weight input has a direct impact on patient safety and on the quality of the imaging scanner output.

Normally the patient weight is entered manually by the technologist who operates the scanner. However, this current method has the drawback of incorporating potential human error, in measurement, transcription or data entry, into the medical imaging exam.

It would be desirable then to be able to eliminate this potential for human error, as well as provide updated and accurate patient weight information, for each image scanning episode.

SUMMARY OF THE INVENTION

The present invention provides for automatic measuring of the weight of the patient by using the medical imaging scanner itself, requiring only minor modifications. The patient weight measurement is determined and provided to the scanner processor unit without any operator assistance.

In accordance with one aspect of the present invention, a method for measuring the weight of a medical imaging scanner patient, the scanner having a bore portion for receiving and housing the patient during a scan, the method comprising the steps of: providing a reclining apparatus associated with the scanner on which the patient can recline during the scan; using a hydraulic lift mechanism to position the reclining apparatus and the patient at bore level; and measuring pressure within the hydraulic lift mechanism as a function of downward force exerted by the reclining apparatus and the patient surface.

Accordingly, it is an object of the present invention to provide automatic patient weight data to a medical imaging scanner system. It is a further object of the present invention that it utilizes the scanner itself to determine patient weight, without requiring operator assistance.

Other objects and advantages of the invention will be apparent from the following description, the accompanying drawings and the appended claims.

BRIEF DESCRIPTION OF THE DRAWINGS

FIGS. 1A and 1B are block diagrams illustrating the components of a medical imaging scanner system according to the present invention.

DETAILED DESCRIPTION OF THE PREFERRED EMBODIMENTS

Figure 1B:
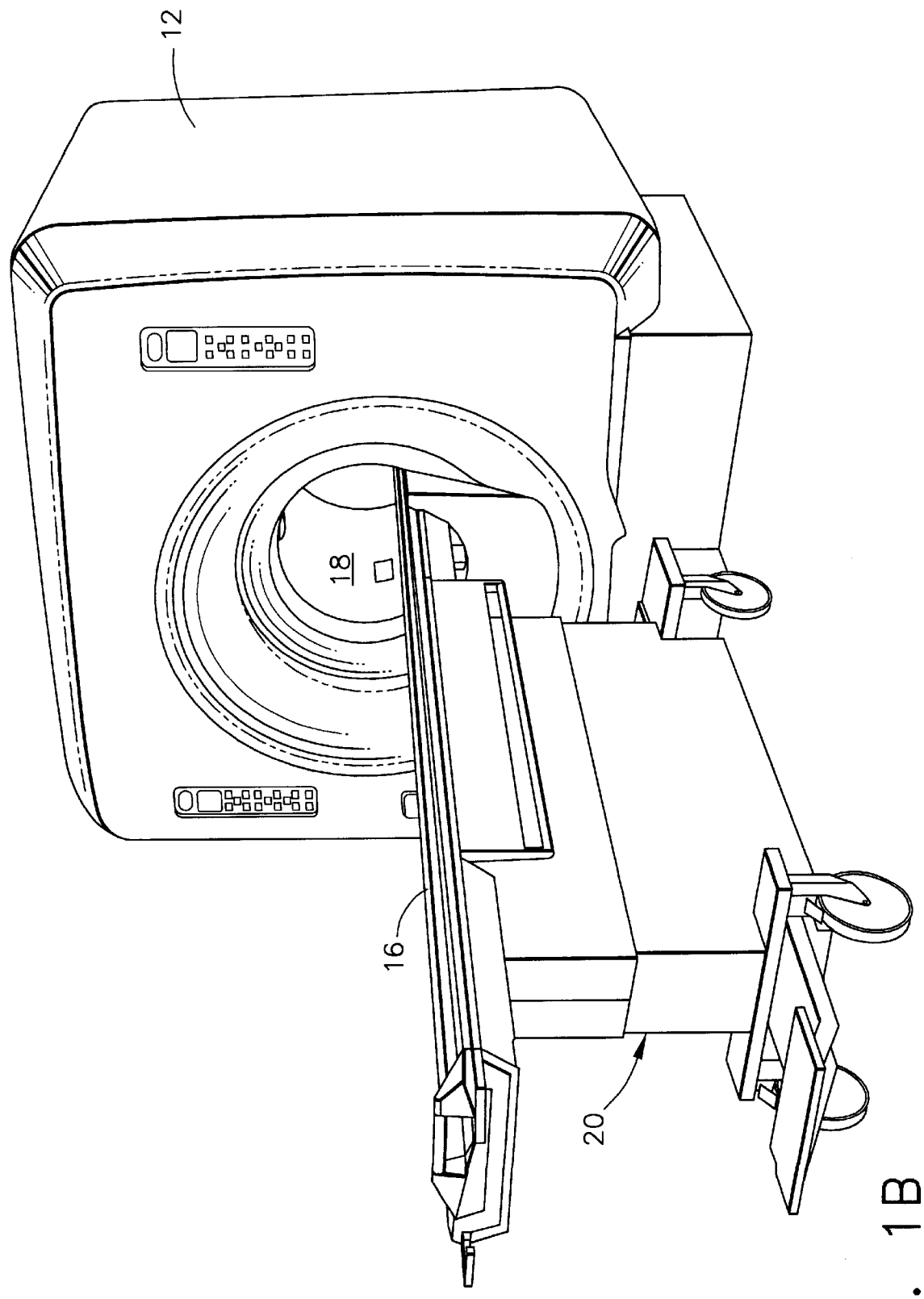
Figure 2:
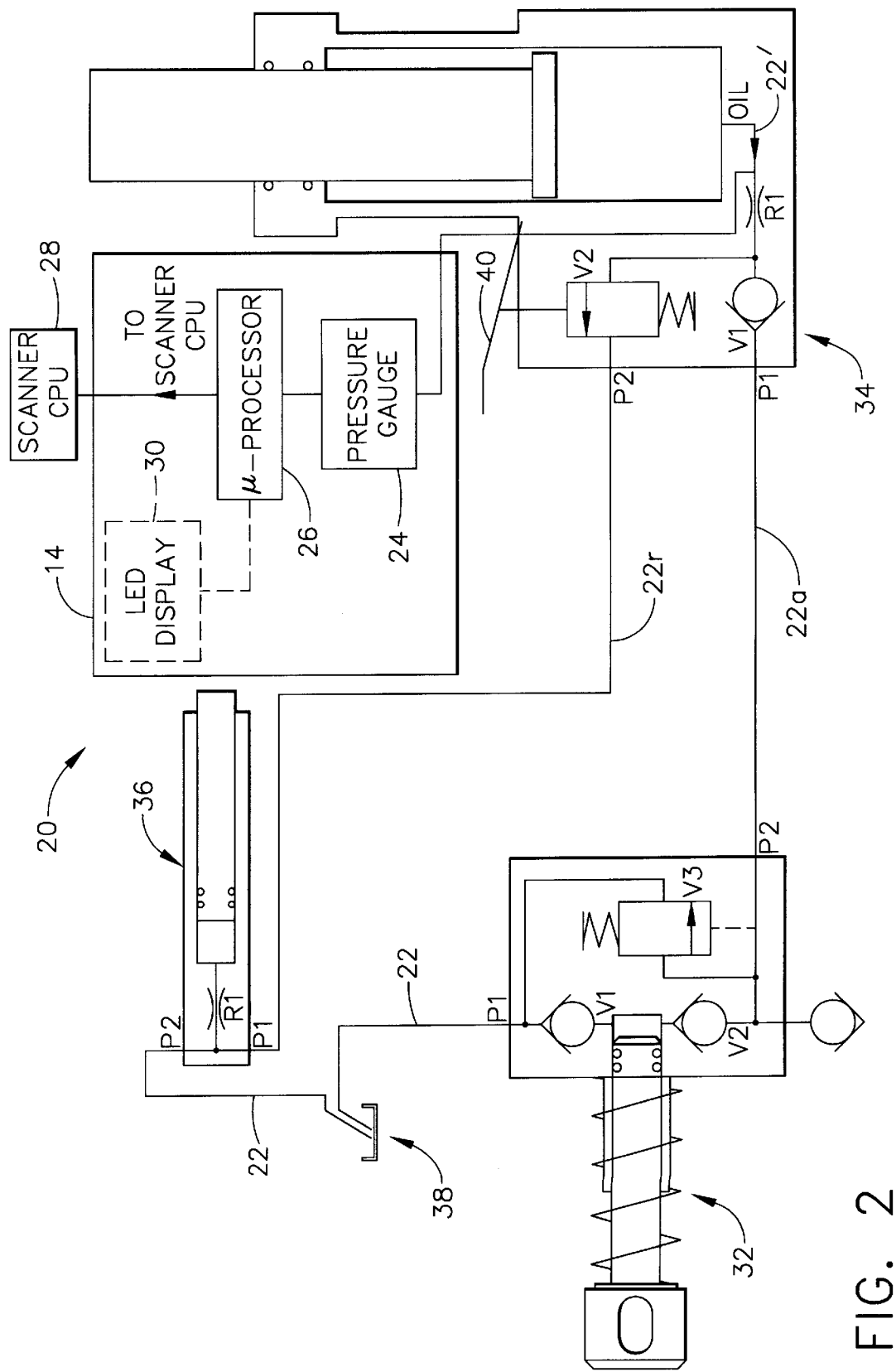
FIG. 2 is a schematic block diagram of the hydraulic lift mechanism, in accordance with the present invention.

Referring to the drawings, specifically FIGS. 1A and 1B, the present invention automatically measures the weight of a patient 10 by using an existing scanner 12 modified with the addition of components within block 14 of FIG. 2. During a scan, the patient 10 reclines on a reclining apparatus 16, such as a table, bed or couch. The table 16 is initially in a lowered position, as in FIG. 1A, outside the bore 18, to allow the patient 10 easy access to it. Then the table 16 and patient 10 are raised to bore level, and slid into the bore 18 of the scanner 10.

In a preferred embodiment of the present invention, the weight or mass of the patient 10 can be measured during the maneuvering of the table 16. As known in the art, the patient table 16 is raised and lowered using a hydraulic lift mechanism 20, illustrated in FIG. 2, and typically located under the actual reclining surface.

The hydraulic lift mechanism 20 of FIG. 2 comprises four basic hydraulic components, including a single piston pump 32, a lift cylinder or ram 34, a dampener 36 and an oil reservoir 38. All of these components are typically located within the patient table 16. The pump 32 siphons oil from the reservoir by means of a spring actuated out stroke, then pushes it into the lift cylinder 34 when the piston is manually inserted. As the oil enters the lift cylinder 34, it displaces the cylinder shaft, causing it to extend outward, thus raising the table. The lift cylinder body is secured to the stationary base of the table 16, while the cylinder shaft is attached to and elevates the table top.

Continuing with the drawings, the table 16 is lowered (cylinder shaft retracted) by manually opening down valve 40, thus allowing oil to flow from the cylinder body back to the reservoir. As oil returns to the reservoir, it passes through the damper body. Hoses 22 link the hydraulic components 32, 34, 36 and 38, and convey the oil. Line 22r is a return line. Hose 22a is a high pressure hose, while all other hoses to and from the reservoir 38 are at atmospheric pressure.

The pressure within line 22', connected to left cylinder or ram 32, is a function of the downward force (weight) exerted by the table 16 and the patient 10. By placing a pressure gauge 24 into that hydraulic line connected to the ram 34, the hydraulic pressure can be accurately measured. Hence, to sense patient weight, the additional force exerted onto the oil within the lift cylinder housing is monitored at the pressure gauge 24.

The patient weight data may be calculated from the measured pressure with a microprocessor unit 26, and the patient weight data may then be transferred to the scanner CPU indicated by block 28, using any standard methods, such as a conducting cable, fiber optics, infra-red signal, etc. It is an advantage of the present invention the no operator assistance is required for the patient weight measurement.

Continuing with FIG. 2, additional displays 30, either in the scan room or in or near the operator console may indicate the patient weight to the technologist. Furthermore, if an rf surface coil, or other peripheral of known weight is known to be present on the table, the CPU may correct the weight reading for the presence of such peripheral(s).

It will be obvious to those skilled in the art that the patient weight may be determined by any of a number of suitable means, without departing from the concept of the invention, that is, to provide an automatic determination of the weight of a medical imaging scanner patient. For example, the patient weight may be measured inertially. Initially, the table is at rest. As the patient table slides into the bore of the scanner, it necessarily accelerates and then decelerates. The inertial mass of the table (and peripherals such as rf surface coils) is known, and in principle the forces applied by the table drive motor can be known also. Since the position of the table at any instant is already known to +/− several millimeters (or better) to perform the imaging task, and since elapsed time is accurately known by the CPU, the instantaneous acceleration of the table and patient can be calculated accurately using the relation $$a_z(t) = d^2 z(t)/dt^2,$$

where the second derivative can be evaluated with standard numerical methods well known in the art. According to Newton's second law of motion, the mass of the patient, $M_p$, can then be determined by $$M_p = [F(t)/a_z(t)] - M_T$$

where $m_T$ is the (known) mass of the table, and F(t) is the applied force in the z-direction on the table. the applied force comprises the following components: drive force, static friction force, sliding friction force and rolling friction force. Of course, the static friction force may be eliminated from the equation by measuring the deceleration, rather than the acceleration from rest. Also, the sliding friction force may have additional dependence on the patient mass, since the patient weight can increase the normal force. The weight of the patient can then be determined from $W_p = M_p g$, where g is the gravitational acceleration. It should be noted that the inertial method described above for measuring patient weight does not require the table to be lowered or raised, and therefore is compatible with medical imaging devices that do not have a varying height table.

The invention has been described in detail with particular reference to certain preferred embodiments thereof, but it will be understood that modifications and variations can be effected within the spirit and scope of the invention.

We claim:

1. A method for measuring the weight of a medical imaging scanner patient, the method comprising the steps of:

providing a reclining apparatus associated with the scanner on which the patient can recline during the scan;

initially setting the reclining apparatus in a lowered position to allow the patient access to the apparatus;

using a hydraulic lift mechanism to raise the reclining apparatus holding the patient; and measuring the weight of the patient as a function of pressure within the hydraulic lift mechanism using downward force exerted by the reclining apparatus and the patient thereby generating a measured pressure value.

2. A method as claimed in claim 1 further comprising the step of using the measured pressure value to calculate patient weight, generating patient weight data.

3. A method as claimed in claim 2 further comprising the step of transferring the patient weight data to a processing unit associated with the scanner.

4. A method for measuring mass of a medical imaging scanner patient, the method comprising the steps of:

initially placing at rest a reclining apparatus associated with the scanner on which the patient can recline during the scan;

sliding the reclining apparatus and patient into a bore associated with the scanner;

measuring the mass of the patient by calculating instantaneous acceleration of the reclining apparatus and patient as the reclining apparatus and patient are slid into the bore.

5. A method for measuring mass of a medical imaging scanner patient as claimed in claim 4 further comprising the step of correcting for inertial mass of the reclining apparatus and known peripherals.

* * * * *